J. S. Thompson.
Animal-Trap.

N° 74451. Patented Feb. 11, 1868.

Witnesses.
D. Brewter
Thos. J. Parker.

Inventor.
J. S. Thompson
By his Attorney.
R. D. O. Smith

United States Patent Office.

J. S. THOMPSON, OF SYCAMORE, ILLINOIS.

Letters Patent No. 74,451, dated February 11, 1868.

IMPROVED ANIMAL-TRAP.

The Schedule referred to in these Letters Patent and making part of the same.

TO ALL WHOM IT MAY CONCERN:

Be it known that I, J. S. THOMPSON, of Sycamore, in the county of De Kalb, and State of Illinois, have invented a new and useful Improvement in Animal-Traps; and I do hereby declare the following to be a full, clear, and exact description of the same, reference being had to the accompanying drawings, in which—

Figure 1:
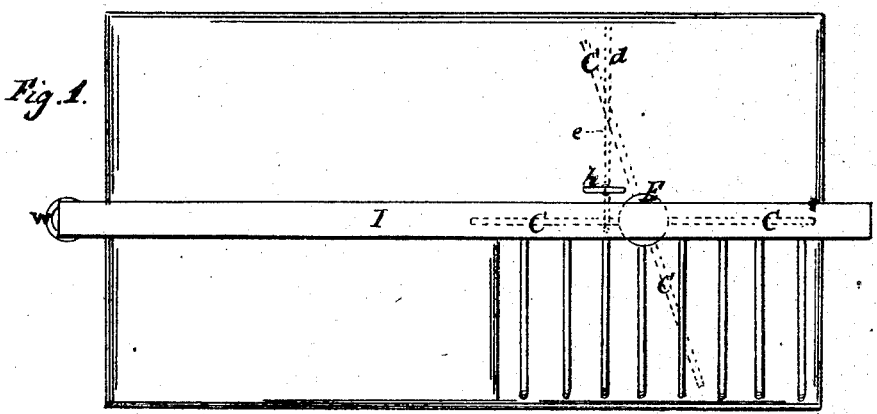
Figure 2:
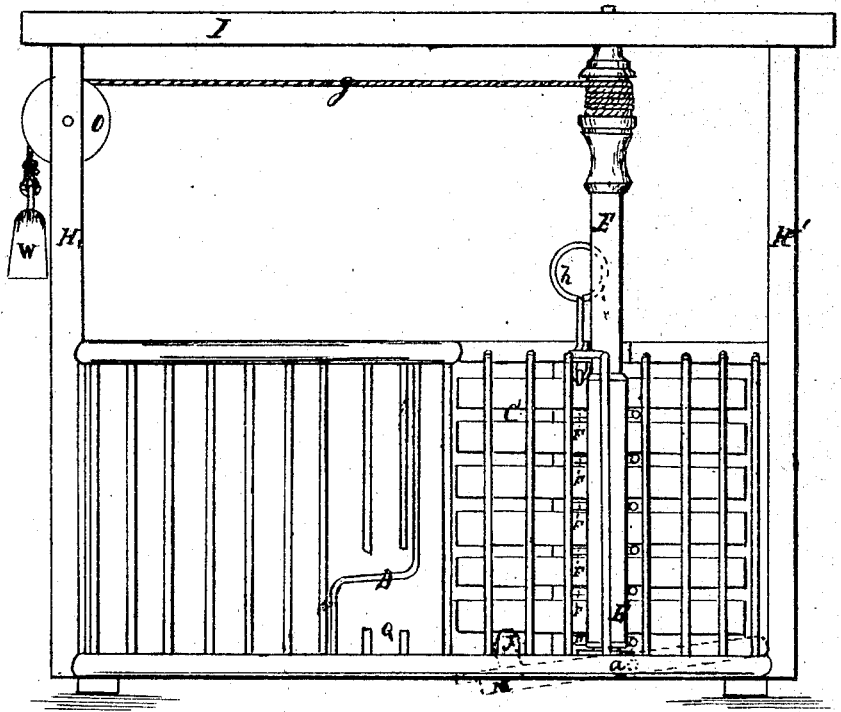

Figure 1 shows a plan of my invention,

Figure 2 a side elevation of the same, and

Figure 3:
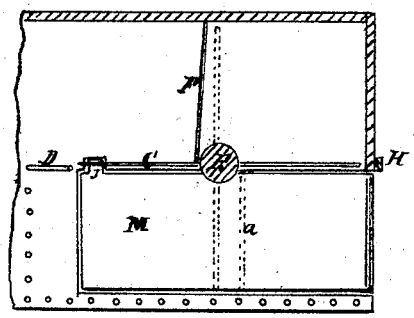
Figure 3:
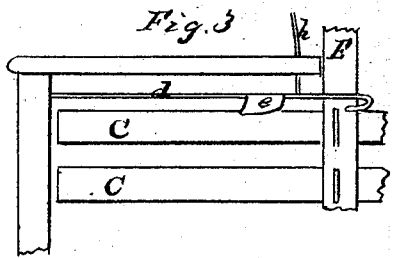

Figure 3 a view of the spring $d$ and catch $e$, with different positions of the gate C.

Figure 4 is a horizontal section of one end of trap, showing platform, gate, &c.

My invention consists in an improvement in animal-traps, whereby the necessity of renewing the bait is avoided, the construction of the trap very much simplified, and the whole arrangement such that there is hardly any possibility of its getting out of order.

That others may understand my invention, its construction, and mode of operation, I will proceed to give a particular description of the same.

It is represented at fig. 1, and consists of a rectangular box, whose length is about twice its width, and of a corresponding height. The top and bottom are made of thin boards, and the two sides and one end of stout wire. In the drawings accompanying this application, a small portion of one side and the half of one end are made of wood. The box is divided into two or three compartments, first, by the wire partition, D, which, beginning at a point about the middle of one side, extends into the trap half way across it and the gate C. The wires forming the partition D are inserted in the floor, and, after rising perpendicularly a short distance, they are bent forward at right angles, about the same distance, and then pass upward to the top, where they are fastened. The wires bent in this manner, together with two or three short ones at the end, form a small recess for confining the bait. Another partition, F, is formed on the opposite side of the trap, of horizontal wires, whose ends are inserted in the post at the end of the wires, forming a portion of that side, and extending half way across the cage to the vertical shaft E of the gate C. The wires of this partition extend a little beyond the bars of the gate C, and are so arranged as to allow the bars to pass between them as the gate revolves. This partition prevents any animal, already within the trap, from passing out as the gate revolves, and the wires forming it may be of sufficient strength to resist alone the efforts of the animal to escape with only one end of each fixed in the post, or the shaft E may be employed to prevent their displacement.

The gate C, when the trap is set, stands parallel to the sides of the cage, and midway between them, at one end, and consists of a vertical shaft, E, having six or more arms, one above the other, from the bottom to the top, and of such length as to extend from the partition D to the end of the cage. The shaft E extends upward through the top to the cross-bar I, which is supported by the posts H and H', one at each end of the trap, and has a pivot in each end, the one at the foot bearing in a step in the floor, and the other passing upward through a vertical hole in the cross-bar, so that it is free to turn at any time when liberated by the latch J of the platform M. A portion of the floor is cut away at the entrance between the gate and the wire side, and in this space is balanced the tilting-platform, M, in such a manner as to remain in the same plane as the rest of the floor, by means of the pin $a$ passing the same and into the adjoining edges of the floor. It has near the inner end, on the edge next the gate, a metal latch, J, secured by a screw, extending a little beyond the edge, and then turned upward, so far as to have the end of the lower cross-bar of the gate C catch against it, when the platform is horizontal or at rest, and, when the same is inclined downward by the weight of any animal, it shall liberate the gate, when it is free to revolve, and on the instant the weight is removed the platform will return to its horizontal position, and the gate be retained as before.

The post H has, near its upper end, a vertical slot, N, in which is a pulley, O. From the upper part of the shaft E extends the cord $g$, over this pulley, to the weight W, to which it is attached, and by which the gate is caused to revolve. At the top of the gate is a spring-latch, $d$, to keep the gate from being pressed open by any animal that may be confined within. Another similar latch, $e$, is used to prevent the gate from being turned backwards, when the same shall be at right angles, or across the cage, as might be necessary, should the animal resist the pressure of the gate and endeavor to return.

In setting the trap the gate is caused to revolve, so as to wind up the cord upon the upper end of the shaft, in the direction indicated by the arrow, (the platform M being lowered and the spring-latches $d$ and $e$ raised by the wire $h$, so as not to catch the gate,) until the weight is at the top of the post H; then, by releasing the platform and latch, and the bait having been secured in the chamber Q, the trap is set.

When any animal, attracted by the bait, enters the trap, it must pass over the platform M, and as soon as it gets near the bait its weight presses the platform down, and the latch J with it. This releases the gate C, which is turned by the weight W, and, as it revolves, it strikes the animal, forcing him into the trap; and as soon as the weight is off the platform, it rises and catches the gate C in its former position, and the trap is reset, as before.

Having thus described my invention, its construction, and mode of operation, what I claim as new, is—

An animal-trap, with a sinking platform, M, and revolving gate, $c$, secured by latches J $a$, constructed and operating, as described.

J. S. THOMPSON.

Witnesses:
  TYLER K. WAITE,
  HENRY COBB.